Patented Apr. 27, 1954

2,676,953

UNITED STATES PATENT OFFICE 2,676,953

METHOD OF PREPARING POLYMERS

George E. Ham, Decatur, Ala., assignor to The Chemstrand Corporation, Decatur, Ala., a corporation of Delaware No Drawing. Application August 27, 1952,
Serial No. 306,715

23 Claims. (Cl. 260—85.5)

This invention relates to a new method of preparing olefinic polymers. More particularly, the invention is concerned with a new method of producing olefinic polymers employing new polymerization catalysts.

The polymerization of polymerizable compounds containing an ethylenic double bond has been initiated by a wide variety of compounds. For example, peroxides have been widely used for this purpose and certain azo compounds have been found useful. However, these catalysts suffer from various defects. Thus, the peroxy compounds may tend to oxidize the polymers as formed and may alter the color thereof or of dyestuffs constained in the polymerization mixture. Certain of the azo compounds, while being of use in addition polymerization, suffer from diminished activity at elevated temperatures. Many of the polymers obtained with peroxy catalysts contain oxidizing residues which prevent direct use of the polymers for some applications. In addition, the peroxy compounds in many instances lead to the production of polymers of reduced solubility in ordinary solvents therefor.

It is an object of the present invention to provide a new method of preparing olefinic polymers from polymerizable ethylenically unsaturated monomers. It is another object of the invention to provide new catalysts for the polymerization of polymerizable monomers having ethylenic unsaturation. Other objects and advantages of the present invention will be apparent from the description thereof hereinafter.

In general, the objects of the present invention are accomplished by subjecting the polymerizable ethylenically unsaturated monomers to polymerizing conditions in the presence of 0.01 to 4.0%, based on the weight of the monomers, of a catalytic organic compound having the following general formula:

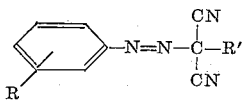

wherein R is selected from the group consisting of hydrogen, alkoxy radicals containing from 1 to 5 carbon atoms, alkyl radicals containing from 1 to 5 carbon atoms, halogen, such as chlorine, bromine, and the like, $SO_3M-$ and $-COOM$ wherein M is an alkali metal, such as sodium, potassium, lithium, and the like, and wherein R' is selected from the group consisting of alkaryl and aralkyl radicals containing 1 to 3 carbon atoms in the alkyl substituent, such as tolyl, phenylethyl, benzyl, and the like, and alkyl groups containing from one to 12 carbon atoms. As examples of suitable compounds falling within the above general formula there may be named, phenylazobenzylmalononitrile, p-anisylazoben- zylmalononitrile, phenylazomethylmalononitrile, p-anisylazomethylmalononitrile, the sodium salt of p-sulfophenylazomethylmalononitrile, the potassium salt of p-carboxyphenylazomethylmalononitrile, p-tolylazobenzylmalononitrile, o-chlorophenylazoethylmalononitrile, etc.

The catalysts of the instant invention are useful in the preparation of various polymers from mono-olefinic monomers either alone or in admixture with other mono-olefinic monomers. Among the suitable monomers useful in the practice of the present invention there may be named acrylonitrile, vinyl acetate and other vinyl esters of monocarboxylic acids, vinyl chloride and other vinyl halides, vinylidene chloride, methyl acrylate and other alkyl esters of acrylic acid, styrene and other vinyl-substituted aromatic hydrocarbons, methyl methacrylate and other alkyl esters of methacrylic acid, methacrylonitrile, dimethyl fumarate and other dialkyl esters of fumaric acid, dimethyl maleate and other dialkyl esters of maleic acid, alpha-vinylpyridine and other vinyl-substituted heterocyclic nitrogen ring compounds, such as the vinylimidazoles, the alkyl-substituted vinylimidazoles, etc., the alkyl-substituted vinylpyridines such as 2-methyl-5-vinylpyridine, etc., vinyl chloroacetate, allyl chloroacetate, methallyl chloroacetate, allyl glycidyl ether, methallyl glycidyl ether, vinylquinoline, allyl glycidyl phthalate, and the corresponding esters of other aliphatic and aromatic dicarboxylic acids, glycidyl acrylate, glycidyl methacrylate, and the like.

While the catalysts of the present invention are useful in the polymerization of any of the above-mentioned mono-olefinic monomers, the catalysts are also useful in the preparation of copolymers and terpolymers from mixtures of the above-mentioned mono-olefinic monomers. Of particular utility are the copolymers and terpolymers comprising acrylonitrile and one or more different polymerizable mono-olefinic monomers. While the copolymers and terpolymers of acrylonitrile may contain any proportion of acrylonitrile it has been found that useful copolymers are those which contain at least 70% by weight in the polymer molecule of acrylonitrile and at least 1% of another polymerizable mono-olefinic monomer and preferably, for the formation of fibers and like structures, the copolymers should contain from 80 to 98% acrylonitrile and from 2 to 20% of another polymerizable mono-olefinic monomer or monomers.

Acrylonitrile is not readily dyeable and consequently it is very often desirable to copolymerize therewith a monomer which contains one polymerizable olefinic radical whereby the copolymerization with acrylonitrile may be effected and one acidic, basic or otherwise reactive group capable of bonding the dyestuffs with which the ultimate fiber or other structure may be treated. As examples of monomers suitable for this purpose there may be mentioned the vinylpyridines, vinylimidazoles, and the like.

The catalysts which are useful in the practice of the present invention may be prepared in the manner described in Journal of American Chemical Society, 73, 4975 (1951).

The catalysts of the instant invention may be employed in any of the usual methods for polymerizing ethylenically unsaturated polymerizable monomers, such as the aqueous emulsion, aqueous suspension, mass, and solution polymerization methods.

The preferred method is the aqueous suspension or dispersion method wherein the monomer or mixture of monomers is added to an aqueous medium maintained under conditions suitable for a rapid but controlled polymerization. In addition to the catalyst, the aqueous medium should contain a dispersing agent which induces the precipitation of a finely divided polymer during the reaction. In order to insure the optimum concentration of the catalyst and dispersing agent, it is frequently desirable to add the catalyst and dispersing agent continuously or intermittently throughout the course of the reaction. The preferred practice involves the charging of the monomers or mixture of monomers, gradually during the course of the reaction at a uniform rate or at a varying rate which permits the maintenance of the reaction at a constant temperature, for example, the reflux temperature.

Among the suitable dispersing agents for practice in the present invention there may be named the water-soluble salts of the sulfonated mahogany acids, salts of the formaldehyde condensed naphthalenesulfonic acids, salts of sulfonated alkylbenzenes, salts of triethanolamine, sodium stearate and other salts of carboxylic acids, and mixtures thereof prepared by the saponification of animal and vegetable oils.

Very often in forming polymers and copolymers of the various monoolefinic materials recited herein, it is desirable to obtain a product having a uniform molecular weight and this is particularly true in the preparation of polymers and copolymers which are to be used in the preparation of fibers, and like structures. In these instances it is often desirable to employ a molecular weight regulator, for example, tertiary dodecyl mercaptan, beta-mercaptoethanol, thioglycolic acid, betamercaptopropionic acid and acetaldehyde.

The catalysts of the present invention are unique in that they combine the non-volatility of diazoaminobenzene derivatives with the reactivity and non-discoloring characteristics of those azo catalysts wherein the carbon atoms attached to the azo group each have a cyano group attached thereto. The method of the instant invention employing the new catalysts disclosed herein, enables one to produce polymeric materials having increased thermal stability. In addition, the polymers produced in accordance with the present invention are produced in increased yields.

While the catalysts of the present invention may be varied in any amount in accordance with the particular monomer or monomers being polymerized, as a practical matter a concentration within the range of 0.01 to 4.0% based on the total weight of monomers, is satisfactory and in most instances, particularly when acrylonitrile is present in the polymerizable mixture, it is preferred to employ the catalysts within the range of 0.1 to 2.0%, based on the total weight of the monomers.

Further details of the present invention are set forth with respect to the following examples which are merely intended to be illustrative and not limitative and the invention should not be limited thereby but only insofar as the same may be limited by the appended claims.

Unless otherwise indicated all parts and percent in the following examples are by weight.

Example I

A mixture of 40 parts of acrylonitrile, 120 parts of distilled water, 0.2 parts of p-anisylazobenzylmalononitrile, and .04 parts of the sodium salt of a formaldehyde condensed naphthalenesulfonic acid was heated in a pressure bottle in a tumbling oven for 19 hours at 75° C. The polyacrylonitrile so obtained was filtered, washed with alcohol, and dried. A yield of 47.7% of polyacrylonitrile, having a specific viscosity in 0.1% dimethylformamide of 0.22, was obtained. In a similar experiment in which p-anisylazobenzylmalononitrile was omitted no polyacrylonitrile was obtained.

Example II

A mixture of 40 parts of acrylonitrile, 10 parts of sodium chloride, 110 parts of water, and 0.2 parts of p - anisylazobenzylmalononitrile was heated for 19 hours at 75° C. On isolating the polyacrylonitrile by filtering, washing with water and alcohol, and drying, a 91.7% conversion was obtained. The polyacrylonitrile possessed a specific viscosity in dimethylformamide of .170.

Example III

The polyacrylonitrile of Example I was dissolved in dimethylformamide to yield a 14% solution and was spun into a mixture of 60% dimethylacetamide-40% water through a 30 hole by .005" spinneret, washed continuously, in hot water, dried on a steam-heated drum, and stretched 405 percent. The fiber so obtained possessed a tenacity of 2.74 g/d and an elongation of 5-6%. In addition, the fiber was found to possess excellent stability toward discoloration on heating for 30 and 90 minutes at 300° F. Under similar conditions a sample of polyacrylonitrile produced by catalysis with 0.5% potassium persulfate discolored badly.

Example IV

A mixture of 99 parts of acrylonitrile and 1 part of phenylazobenzylmalononitrile was allowed to react for 18 hours at 25° C. Substantially complete conversion to polymer occurred.

Example V

A mixture of 40 parts of acrylonitrile, 120 parts distilled water, and 0.2 parts of phenylazobenzylmalononitrile was heated for 24 hours at 80° C. A yield of 27.2% polyacrylonitrile, having a specific viscosity in 0.1% dimethylformamide of .447, was obtained. Under the same conditions in the absence of catalyst, no polymerization occurred. A sample of the polymer in the first case was heated at 180° C. for two hours with almost no discoloration. Another sample of polyacrylonitrile prepared with 0.5% potassium persulfate discolored badly under the same conditions.

Example VI

Two 25 g. samples of 2-methyl-5-vinylpyridine were placed in 1 oz. French square bottles and .05 g. of phenylazobenzylmalononitrile added to one sample. After flushing with nitrogen both bottles were sealed and placed in a 60° C. oven for 17 hours and an 85° C. oven for 40 days. At the end of this time, both samples were almost completely polymerized, but the sample made with phenylazobenzylmalononitrile as catalyst was much lighter in color than the sample made with no added catalyst.

*Example VII*

A mixture of 38 parts of acrylonitrile, two parts of vinyl acetate, 10 parts of sodium chloride, 110 parts of water, and 0.2 part of p-anisylazobenzylmalononitrile was heated for 20 hours at 75° C. Substantially complete conversion of monomer to copolymer was obtained.

*Example VIII*

A mixture of 40 parts of acrylonitrile, 110 parts of water, 0.1 gram of di-2-ethylhexyl ester of sodiosulfosuccinic acid, and 0.4 gram of the sodium salt of p-sulfophenylazomethylmalononitrile was placed in a pressure bottle and allowed to react in a tumbling oven for 24 hours at 75° C. The polymer so obtained was filtered, washed with water, and dried. A good yield of polyacrylonitrile was obtained.

*Example IX*

The same procedure as described in Example VIII was followed with the exception that the potassium salt of p-carboxyphenylazoamylmalononitrile was employed as catalyst. A good yield of polyacrylonitrile was obtained.

Thus by means of the present invention it is possible to produce polymers from polymerizable ethylenically unsaturated monomers which have good color and good thermal stability. The color of the polymers does not change or deteriorate appreciably upon prolonged heating. In addition, by employing the catalysts of the instant invention, the polymers are produced in increased yields. The instant catalysts are highly active at elevated temperatures and there is no danger of oxidizing the polymers as they are formed. Numerous other advantages of the invention will be apparent to those skilled in the art.

It is to be understood that changes and variations may be made without departing from the spirit and scope of the present invention as defined in the appended claims.

I claim:

1. A method of preparing polymers which comprises bringing a polymerizable ethylenically unsaturated monomer in contact with a compound having the formula:

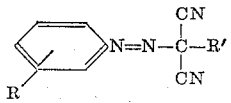

wherein R is selected from the group consisting of hydrogen, alkoxy radicals containing from one to 5 carbon atoms, alkyl radicals containing from one to 5 carbon atoms, halogen, SO₃M, and —COOM, wherein M is an alkali metal, and wherein R' is selected from the group consisting of alkaryl and aralkyl radicals containing from one to 3 carbon atoms in the alkyl substituent, and alkyl radicals containing from one to 12 carbon atoms.

2. The method as defined in claim 1 wherein the monomer is acrylonitrile.

3. The method as defined in claim 1 wherein the monomer is 2-methyl-5-vinylpyridine.

4. The method as defined in claim 1 wherein the polymerization is conducted in the presence of water.

5. The method as defined in claim 1 wherein the compound is present to the extent of from 0.01% to 4.0% of the total monomer.

6. A method of preparing a copolymer of from 80 to 98% by weight in the polymer molecule of acrylonitrile and from 2 to 20% of another copolymerizable mono-ethylenically unsaturated monomer, which comprises bringing the monomeric mixture into contact with a compound having the formula:

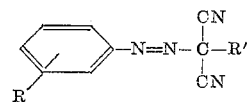

wherein R is selected from the group consisting of hydrogen, alkoxy radicals containing from one to 5 carbon atoms, alkyl radicals containing from one to 5 carbon atoms, halogen, SO₃M, and —COOM, wherein M is a alkali metal, and wherein R' is selected from the group consisting of alkaryl and aralkyl radicals containing from one to 3 carbon atoms in the alkyl substituent, and alkyl radicals containing from one to 12 carbon atoms.

7. The method as defined in claim 6 wherein the monomer is vinyl acetate.

8. The method as defined in claim 6 wherein the monomer is vinylpyridine.

9. The method as defined in claim 6 wherein the monomer is styrene.

10. The method as defined in claim 6 wherein the monomer is 2-methyl-5-vinylpyridine.

11. The method as defined in claim 6 wherein the monomer is methyl methacrylate.

12. The method as defined in claim 6 wherein the polymerization is conducted in the presence of water.

13. The method as defined in claim 6 wherein the compound is present to the extent of from 0.01% to 4.0% of the total monomer.

14. The method as defined in claim 1 wherein the compound is phenylazobenzylmalononitrile.

15. The method as defined in claim 1 wherein the compound is p-anisylazobenzylmalononitrile.

16. The method as defined in claim 1 wherein the compound is sodium salt of p-sulfophenylazomethylmalononitrile.

17. The method as defined in claim 1 wherein the compound is p - anisylazomethylmalononitrile.

18. The method as defined in claim 1 wherein the compound is potassium salt of p-carboxyphenylazoamylmalononitrile.

19. The method as defined in claim 6 wherein the compound is phenylazobenzylmalononitrile.

20. The method as defined in claim 6 wherein the compound is p-anisylazobenzylmalononitrile.

21. The method as defined in claim 6 wherein the compound is sodium salt of p-sulfophenylazomethylmalononitrile.

22. The method as defined in claim 6 wherein the compound is p-anisylazomethylmalononitrile.

23. The method as defined in claim 6 wherein the compound is potassium salt of p-carboxyphenylazoamylmalononitrile.

No references cited.